July 29, 1952
G. B. HILL
2,604,844
SAFETY DEVICE FOR WITHDRAWING
NEEDLES FROM BALE CASES
Filed Nov. 29, 1946
2 SHEETS—SHEET 1
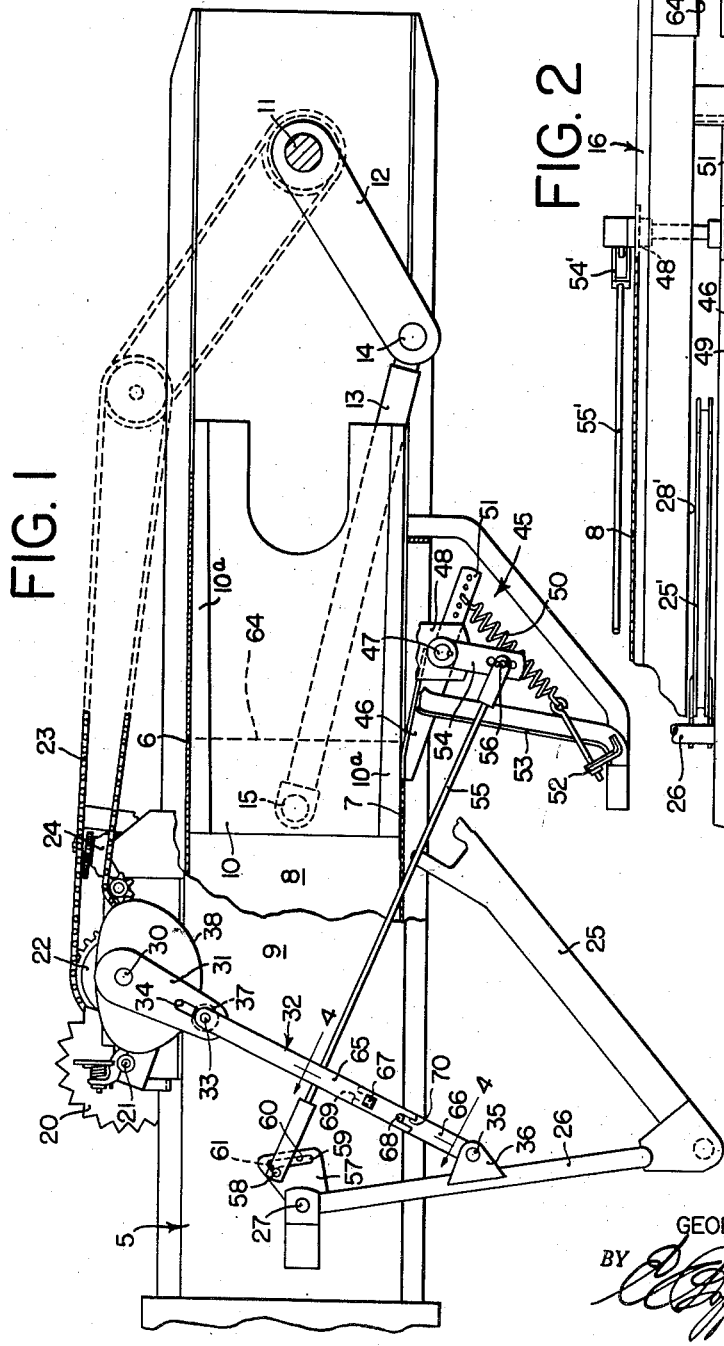
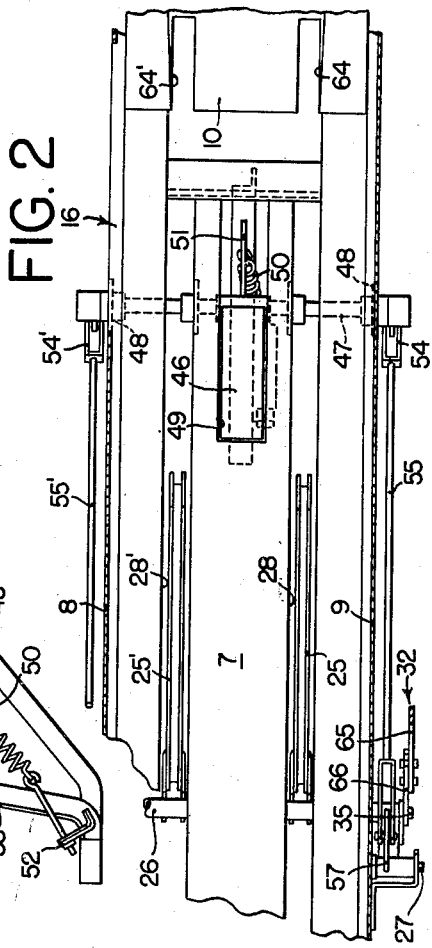
*INVENTOR.*
GEORGE B. HILL
BY
*ATTORNEYS.*

July 29, 1952
G. B. HILL
2,604,844
SAFETY DEVICE FOR WITHDRAWING
NEEDLES FROM BALE CASES
Filed Nov. 29, 1946
2 SHEETS—SHEET 2
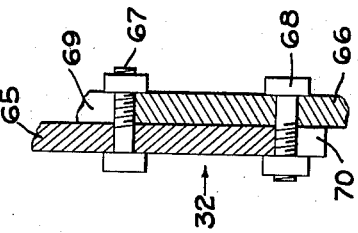
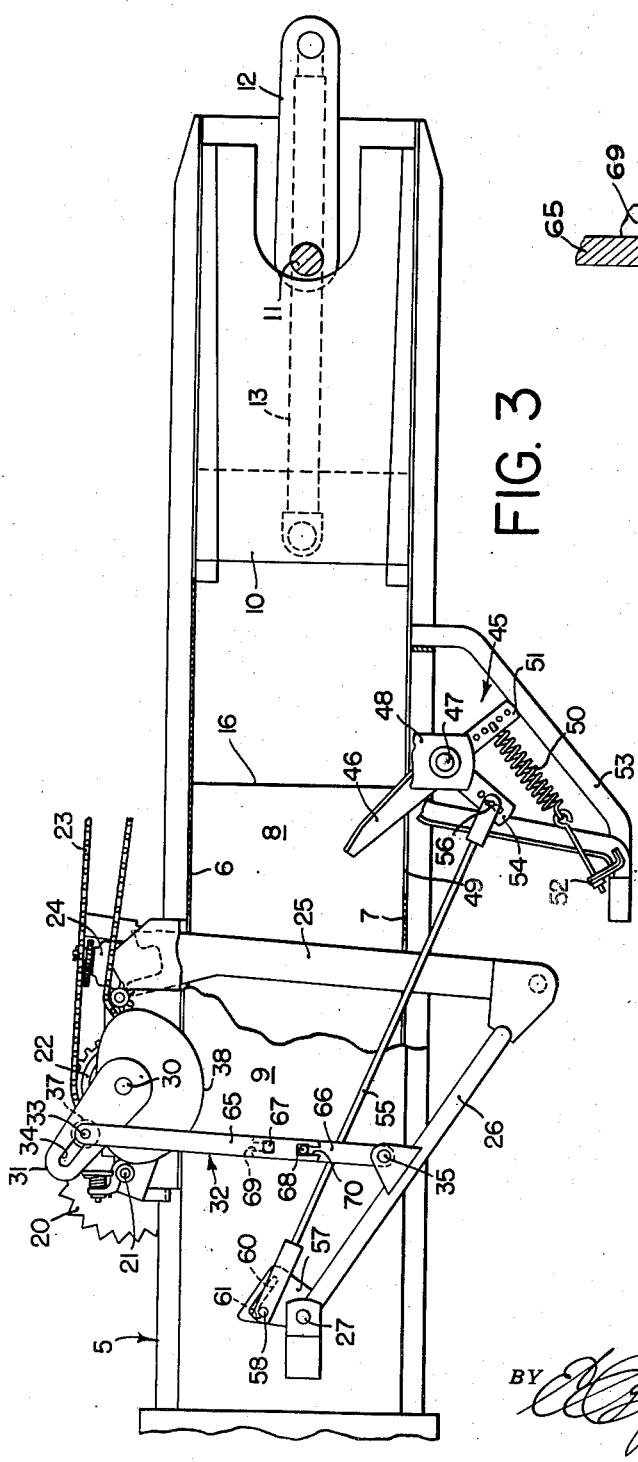
INVENTOR
GEORGE B. HILL
BY
ATTORNEYS Patented July 29, 1952

2,604,844

UNITED STATES PATENT OFFICE 2,604,844

SAFETY DEVICE FOR WITHDRAWING NEEDLES FROM BALE CASES

George B. Hill, Ottumwa, Iowa, assignor to Deere Manufacturing Co., a corporation of Iowa Application November 29, 1946, Serial No. 712,923

13 Claims. (Cl. 100—4)

The present invention relates generally to baling presses and more particularly to baling presses of the type which automatically measure the length of the bale being formed and tie the latter when it attains the predetermined length. The automatic bale tying mechanism includes a device known as a "needle," which is inserted through an opening in one wall of the bale case to bring the wire or twine around the end of the bale to a position in which the knot can be made. Inasmuch as the needle must travel through the bale case across the path of the baling plunger, it is necessary to complete the tying operation and withdraw the needle between strokes of the plunger. This requires a close synchronization between the movements of the needle and the plunger, and it is well known to those skilled in the art that if the needle drive mechanism fails or for any reason departs from synchronized relation with the plunger drive mechanism, the plunger will strike the needle inside the bale case, and substantial damage will result therefrom.

One of the principal objects of my invention, therefore, relates to the provision of a safety device, which will cause the needle to be forced out of the bale case in advance of the plunger, in the event of failure of the needle drive mechanism.

More specifically, an object of my invention has to do with the provision of a safety device actuated by the plunger itself, for driving the needle out of the bale case, responsive to movement of the plunger toward the needle, when the plunger reaches a certain point in its range of travel.

In the accomplishment of these objects, I have provided a control lever which is swingable into the bale case to a position in which it is engaged by the plunger during reciprocative movement of the latter. This control lever is connected by suitable linkage to the needle, so that upon approach of the plunger if the needle drive mechanism fails, the plunger engages the control lever which pulls the needle out of the bale case in time to clear the plunger. This problem is somewhat complicated by the fact that the needle must be inserted into the case at the beginning of a tying operation, before the plunger has been retracted from engagement with the control lever, and therefore it is a further object of my invention to provide a lost motion connection between the needle and the lever so that the needle can be inserted through the bale case during an outward movement of the plunger in the case in contact with the control lever, while an inward movement of the plunger over the control lever will drive the needle out of the bale case.

Still another object relates to the provision of a drive connection to the needle which is adapted to yield and to be released, thereby separating the drive mechanism from the needle to permit the latter to be driven out of the bale case by action of the plunger in the event of failure of the drive mechanism or of failure of the mechanism to properly synchronize with the plunger.

These and other objects and advantages of my invention will be apparent to those skilled in the art after a consideration of the following description, in which reference is had to the drawings appended hereto, in which Figure 1 is an elevational view of a baling press embodying the principles of the present invention, a portion of the bale case being broken away to expose the plunger;

Figure 2 is a fragmentary top plan view of a portion of the bale case, the top of which has been removed to expose the interior thereof;

Figure 3 is an elevational view similar to Figure 1, but with the parts shown in position during the tying operation;

Figure 4 is an enlarged fragmentary section on line 4—4 of Figure 1.

Referring now to the drawings, the bale case is indicated by reference numeral 5 and comprises top and bottom walls 6, 7 and a pair of vertical side walls 8, 9, forming an elongated case of substantially square cross section. A plunger 10 is slidably disposed within the bale case 5 by means of conventional wooden wear blocks 10a, and is adapted to reciprocate longitudinally within the bale case. The plunger 10 is driven from a crankshaft 11, journaled in the case on a transverse axis and provided with a crank arm 12, rigidly fixed thereto. The crank arm 12 is connected with the plunger 10 by means of a connecting rod 13 which is swingably connected to the end of the crank 12 by a bearing 14, and journaled at its opposite end within the plunger 10 on a transverse bearing 15. A feed opening 16 is provided in the wall 8, through which the crops or other material to be baled is fed during retraction of the plunger 10, as indicated in Figure 3. The plunger then compresses the material toward the left, as viewed in the drawings, each charge of material being pressed into the bale which is being formed within the bale case.

The length of each bale is determined by a serrated measuring wheel 20 rotatably mounted on a shaft 21 on top of the bale case in a position in which the periphery of the wheel 20 extends through a slot in the top wall 6 and engages the top of the bale being formed. The wheel 20 controls the actuation of a self-interrupting clutch device 22 which receives power from the main crank shaft 11, as by a drive chain 23 for the purpose of actuating the bale tying mechanism 24. The bale tying mechanism 24 operates in cooperation with a needle 25 which is mounted on a U-shaped bail 26, the two arms of which are pivotally mounted at 27 on a pair of coaxially disposed pivot connections on the two vertical side walls 8, 9, respectively, the central portion of the bail extending transversely beneath the bale case 5 to carry one or more needles, two of which 25, 25' are indicated in Figure 2. The needles are disposed in transversely spaced relation on the bail 26 and are swung upwardly through a pair of longitudinally extending slots 28, 28' in the bottom wall 7 of the bale case, when the bail 26 is swung in a counterclockwise direction, as viewed in Figures 1 and 3, about the axis of the pivot mountings 27, from the inactive or starting position shown in Figure 1, to the raised position shown in Figure 3, where the needles 25, 25' are inserted upwardly through the slots 28, 28', respectively, to bring the upper ends of the needles into cooperative tying relation with the tying mechanism 24.

The needles 25 and 25' and bail 26 are actuated by power from the self-interrupting clutch mechanism 22, which is transmitted through a normally stationary shaft 30, on which is rigidly fixed a crank arm 31. The arm 31 is connected to the bail 26 by means of a link 32, pivotally connected to the arm 31 by means of a pin 33 extending through a radially disposed slot 34 in the arm 31. The opposite end of the link 32 is connected by a pivot pin 35 to a bracket 36 rigidly mounted on the arm of the bail 26. A roller 37 is journaled on the pin 33 and is disposed in engagement with a camming track 38, mounted in fixed position on top of the bale case. When the clutch mechanism 22 rotates the shaft 30 through a single revolution, the arm 31 raises the bail 26 through the link 32, and the roller 37 rolls around the camming track 38, which causes the needle to be quickly raised into tying position, the upper portion of the camming track 38 being flat to retain the needle in this position during the tying operation, after which the bail 26 and its supported needles are rapidly lowered to the inactive position.

Power for driving the plunger 10 and tying mechanism is obtained from any suitable source, such as an internal combustion engine (not shown) connected to the crank shaft 11. The power transmitting chain 23 is connected to the clutch 22 in timed relation to provide for raising the needles 25, 25' as the plunger 10 moves into contact with the bale to compress the latter, the needles being lowered by the clutch mechanism 22 out of the path of the plunger 10 while the latter is approaching the needles on the succeeding stroke, moving toward the left, as viewed in the drawings.

The wire tying mechanism and needle drive mechanism have been described only briefly above, inasmuch as the details of this part of the mechanism do not form an essential part of the present invention. A more complete description can be found in U. S. Patent 2,512,896 to J. R. West filed June 8, 1945, to which reference is made for a complete disclosure of the needle driving mechanism.

Coming now to that portion of the device with which my invention is more particularly related, it will be noted that in the event of failure of the needle drive mechanism after the needles have been raised into tying position, as illustrated in Figure 3, such as, for example, should the drive chain 23 break with the needles in raised position, the plunger 10 on its succeeding stroke would obviously strike the needles and cause considerable damage to the needles and possibly to the tying mechanism, if it were not for the safety device which is indicated in its entirety by reference numeral 45.

The safety device 45 comprises a control lever 46 which is fixed to a rockable shaft 47, the latter being disposed transversely beneath the bale case 5 and journaled in a pair of supporting brackets 48 at opposite sides of the bale case. The lever 46 is free to swing upwardly through a slot 49 in the bottom wall 7 of the bale case, into the path of movement of the plunger 10. The lever 46 is urged upwardly into the bale case by means of a coil spring 50 connected between an arm 51 fixed to the control lever 46 and extending oppositely therefrom, to a bracket 52 supported on a framework 53 beneath the bale case.

The shaft 47 is provided with a depending arm 54, rigidly fixed thereto, which is connected to the bail 26 through a link 55, pivoted to the arm 54 by a pin 56. The link 55 extends alongside the vertical wall 9 of the bale case 5 and is connected to a plate 57 by means of a pin 58. The plate 57 is rigidly fixed, as by welding, to the bail arm 26 adjacent the pivot mounting 27 of the latter and the pin 58 extends through a slot 59 in the plate 57. The slot 59 is angular in shape, having a main portion 60 which is substantially parallel to the bail arm 26 and has a short slot or notch 61 at the inner end of the slot 60, extending inwardly toward the pivot 27.

During the formation of a bale, the parts are disposed in the positions indicated in Figure 1, the plunger 10 reciprocating longitudinally of the bale case 5, while the needle 25 is held below the bottom wall 7 of the bale case. In this position, the plate 57 is disposed with the slot portion 60 in a generally vertical position, while the short slot 61 is disposed on a slight angle from the horizontal. The pin 58 is disposed in the end of the short slot 61, and inasmuch as the bail 26 is locked in a down position by the link 32 and roller 37 bearing against the lower edge of the camming track 38, the link 55 is forced to the right to urge the lever 46 downwardly against the tension of the spring 50, out of the path of movement of the plunger 10.

After the bale has attained the predetermined length, the clutch device 22 transmits power from the continuously running chain 23 to the normally stationary shaft 30, swinging the arm 31 in a complete revolution, thereby causing the bail 26 and needles 25, 25' to be raised to insert the needles 25, 25' through the slots 28, 28' and across the bale case. The needles 25, 25' are inserted through the slots 28, 28' while the plunger 10 is still in contact with the bale, the plunger being provided with longitudinally extending slots 64, 64', in the front or working face of the plunger, through which the needles 25, 25' are inserted. This angular movement of the bail 26 and therefore the plate 57 swings the latter about the pivot axis 27, allowing the lever 46 to bear against the bottom side of the plunger 10, which is at this time sliding away from the needle 25. In this position of the plate 57, the pin 58 is readily lifted out of the short notch 61 and travels along the longer portion 60 of the slot 59 as the plate 57 moves with the bail 26.

As soon as the plunger 10 is withdrawn from contact with the lever 46, the spring 50 urges the latter upwardly through the slot 49 into the bale case, and simultaneously moves the link 55 forwardly, causing the pin 58 to slide forwardly in the slot 60 to the inner end of the latter. When the needle 25 reaches its tying position, as shown in Figure 3, the short portion 61 of the slot 59 is disposed in a vertical position, so that when the pin 58 reaches the inner or left hand end of the long slot portion 60 it drops downwardly by force of gravity into the notch 61. Normally, as the plunger 10 begins to move toward the needle again, the needle drive arm 31 continues to rotate and forces the link 32 and bail 26 downwardly, thereby withdrawing the needle 25 from the bale case before the plunger 10 arrives at that position. However, in the event that the needle drive clutch mechanism 22 should fail, or the drive chain 23 should break, or any other failure should occur which would leave the needle in raised position within the bale case in the path of the plunger 10, the plunger first engages the control arm 46, pressing the latter downwardly and swinging the rockable shaft 47 about its axis, thereby applying a tensional force through the link 55 and pin 58 to the plate 57. The direction of force is transverse to the short slot 61 or notch, which causes the tensional force from the link 55 to pull the plate 57 and bail 26 in a clockwise direction about the supporting axis 27, thereby forcing or driving the needle 25 downwardly out of the bale case. In effect, the mechanism 46—54—55 is a second driving means in parallel with the means 30—31—32 and is operative in the event of failure of the latter.

In order to prevent the drive mechanism from interfering with the movement of the bail 26 and needle 25, the link 32 is provided in two separable parts 65, 66 disposed in overlapping arrangement and secured together by a pair of nut and bolt assemblies 67, 68 (Fig. 4). The bolt 67 passes through an aperture in the part 65 and through a slot 69 in the end of the lower separable section 66, while the other bolt 68 passes through an aperture in the part 66 and through a slot 70 in the end of the upper separable section 65.

Hence, the bolts 67, 68 when normally tightened merely hold the two link sections 65, 66 together by frictional contact, but the latter are readily pulled apart when the needle is driven downwardly out of the bale case. That is to say, the tightness of the bolts and nuts is sufficient to prevent separation of the sections 65 and 66 during normal operation but insufficient to prevent separation when a tensional force is applied to said sections upon reverse angular movement of the needle bail 26 by action of the mechanism 46—54—55.

I claim:

1. In a baling press comprising a bale case, having an opening in a wall thereof, a needle shiftable through said opening and across said case, mechanism for reciprocatively driving said needle into and out of said case including a yieldable connection with said needle, and a plunger reciprocatively slidable within said case, the combination of a control element actuated by said plunger, and means connecting said element with said needle for withdrawing the latter out of said bale case in the event of failure of said needle shifting means, said yieldable connection being adapted to be disabled to disconnect said needle from said mechanism to facilitate withdrawal of the needle.

2. The combination set forth in claim 1, including the further provision that said control element comprises a lever pivotally mounted on said bale case and projecting through an aperture in the latter into the path of movement of said plunger and adapted to be swung about its pivot mounting by engagement with the reciprocating plunger.

3. In a baling press comprising a bale case, having an opening in a wall thereof, a needle alternately extendible and retractable through said opening and across said case, driving means for reciprocatively moving said needle into and out of said case, a plunger reciprocatively slidable within said case, and driving means for said needle and said plunger synchronized to avoid interference therebetween, the combination of a control element actuated by movement of said plunger within a certain portion of its range of movement, and means additional to the needle-driving means and controlled by said control element for retracting said needle out of the path of movement of said plunger to protect the needle against damage by said plunger in the event of failure of said needle driving means to retract the needle.

4. In a baling press comprising a bale case, having an opening in a wall thereof, a needle alternately extendible and retractable through said opening and across said case in a needle zone, means for reciprocatively moving said needle into and out of said case, a plunger reciprocatively slidable within said case, and driving means for said needle and said plunger synchronized to avoid interference therebetween, the combination of a control element actuated by movement of said plunger within a certain portion of its range of movement, and means additional to the needle-driving means and including a lost motion connection for connecting said control element with said needle for retracting said needle out of the path of movement of said plunger as the latter approaches said needle zone in the event of failure of the needle driving means to retract the needle, said lost motion connection being adapted to disable said connecting means during movement of said plunger away from said needle zone.

5. In a baling press comprising a bale case, having an opening in a wall thereof, a needle shiftable through said opening and across said case, means for reciprocatively moving said needle into and out of said case, a plunger reciprocatively slidable within said case, and driving means for said needle and said plunger synchronized to avoid interference therebetween, the combination of a control lever pivotally mounted on said bale case and projecting through an aperture in the latter into the path of movement of said plunger and adapted to be swung about its pivot mounting by engagement with the reciprocating plunger at a certain point in the range of movement of the latter, and a connection between said lever and said needle, including engageable and disengageable elements normally engaged for establishing said connection to cause the needle to be moved out of said case by engagement of said plunger with said lever during movement of said plunger toward said needle, said elements being engaged responsive to movement of said needle into said bale case while said plunger is engaged with said lever during movement of the plunger away from said needle.

6. The combination set forth in claim 5, including the further provision of a pivoted arm on which said needle is supported for swinging movement into and out of said case, said disengageable elements comprising a plate having a slot therein provided with an angular slot portion and a pin adapted to slide in said slot and to engage in said angular slot portion.

7. The combination set forth in claim 5, including the further provision of a pivoted arm on which said needle is supported for swinging movement into and out of said case, and spring means for urging said lever toward a position in the path of said plunger, said driving means including a yieldable connection with said needle supporting arm, said connection being yieldable to disable the driving connection to permit said needle to be driven out of said case by said plunger engaging said lever.

8. In a baling press comprising a bale case having an opening in a wall thereof, a needle supporting arm pivotally mounted on said bale case, a needle attached to said arm and swingable about the pivot axis of the latter through said opening and across said case, a plunger reciprocatively slidable within said case, and driving means for said needle and said plunger synchronized to avoid interference therebetween and including a separable drive connection to said needle arm, the combination of a control lever pivotally mounted on said case and projecting through an aperture in the latter into the path of movement of said plunger and adapted to be swung about its pivot mounting by engagement with the plunger at a certain point in the range of reciprocating movement of the latter, spring means urging said lever into said bale case, and a tie connection between said lever and said needle arm adapted to cause said needle to be forced out of said case by engagement of said plunger with said lever during movement of said plunger toward said needle when the latter is disposed within said case in the path of said plunger, said drive connection being separable to permit the needle to be forced out of said case, said tie connection including a pair of disengageable elements, which are disengaged responsive to movement of said needle into said bale case while said plunger is engaged with said lever during movement of the plunger away from said needle, said elements being engageable by movement of said lever into said bale case by said spring means after said plunger has been retracted from engagement with said lever.

9. In a baling press having a baling chamber, the combination of bale-forming means including a bale-forming element for forming bales in the chamber, and mechanism for driving said element in a certain cycle; bale-tying means including a tying member movable from a starting position through a certain cycle and return to said starting position; means including a first driving connection with the bale-forming means for driving the tying member completely through its cycle in synchronism with the cycle of the bale-forming element; and means including a second connection between the tying means and the bale-forming means and additional to the first driving connection for driving the tying means in only the return portion of its cycle to insure return of the tying member toward its starting position in the event of failure of said first connection.

10. In a baling press having a driving source and a baling chamber, the combination of bale-forming means including a bale-forming element for forming bales in the chamber, and means connected to said driving source for driving said element in a certain cycle; bale-tying means including a tying member movable from a starting position through a certain cycle; means including a first driving connection with the driving source for driving the tying member through its cycle of the bale-forming element; and means including a second driving connection between the tying means and the bale-forming means and in parallel with the first driving connection for returning the tying member toward its starting position in the event of failure of said driving connection.

11. In a baling press having a driving source and a baling chamber, the combination of bale-forming means including a bale-forming element for forming bales in the chamber, and means connected to said driving source for driving said element in a certain cycle; bale-tying means including a tying member movable from a starting position through a certain cycle and return to its starting position; means including a first driving connection with the driving source for driving the tying member completely through its cycle in synchronism with the cycle of the bale-forming element; and means including a second connection between the tying means and the driving source and separate from the first driving connection for returning the tying member toward its starting position in the event of failure of said first driving connection.

12. In a baling press comprising a bale case, bale-forming means movable in the bale case in a defined path, a tying member movable in the bale case into and out of the path of said bale-forming means, and means for driving the tying member into and out of the path of the bale-forming means, the combination of a movable force-transmitting element associated with the tying member in such manner as to be ineffective to transmit force to the tying member while the tying member is out of the path of the bale-forming means, means operative in response to movement of the tying member into the path of the bale-forming means for effecting a force-transmitting connection between the tying member and said element, and drive means separate from the aforesaid driving means and connecting said element and the bale-forming means and effective through said force-transmitting connection to move the tying member out of the path of said bale-forming means in the event of failure of said tying member driving means to remove the tying member.

13. In a baling press including a bale case, a plunger slidable in the bale case in a defined path, a needle member shiftable transversely through said case into and out of the path of said plunger, and means for shifting said needle member into and out of said path, the combination of a movable force-transmitting element associated with the needle member in such manner as to be ineffective to transmit force to the needle member while said needle member is out of the path of the plunger, means operative in response to movement of the needle member into the path of the plunger for effecting a force-transmitting connection between the needle member and said element, and drive means separate from the needlemember-shifting means and connecting said element and the plunger and effective through the force-transmitting connection to move the needle member out of the path of said plunger in the event of failure of said needle-member-shifting means to remove the needle member.

GEORGE B. HILL.

REFERENCES CITED

The following references are of record in the file of this patent:

UNITED STATES PATENTS

| Number | Name | Date |
| --- | --- | --- |
| 947,039 | Hart | Jan. 18, 1910 |
| 1,075,376 | Pearson | Oct. 14, 1913 |
| 1,257,466 | Dudley | Feb. 26, 1918 |
| 2,236,628 | Nolt | Apr. 1, 1941 |
| 2,361,742 | Bunn | Oct. 31, 1944 |
| 2,405,688 | Crumb | Aug. 13, 1946 |